(12) United States Patent
Joret et al.

(10) Patent No.: US 10,753,315 B2
(45) Date of Patent: Aug. 25, 2020

(54) REAR ASSEMBLY OF A TURBOJET ENGINE NACELLE INCLUDING A FIREPROOF SEALING DEVICE

(71) Applicant: Safran Nacelles, Gonfreville L'Orcher (FR)

(72) Inventors: Jean-Philippe Joret, Gonfreville L'Orcher (FR); Jérôme Corfa, Gonfreville L'Orcher (FR); Serge Bunel, Gonfreville L'Orcher (FR); Xavier Bouteiller, Gonfreville L'Orcher (FR)

(73) Assignee: Safran Nacelles, Gonfreville L'Orcher (FR)

( * ) Notice: Subject to any disclaimer, the term of this patent is extended or adjusted under 35 U.S.C. 154(b) by 40 days.

(21) Appl. No.: 16/246,605

(22) Filed: Jan. 14, 2019

(65) Prior Publication Data

US 2020/0025135 A1   Jan. 23, 2020

Related U.S. Application Data

(63) Continuation of application No. PCT/FR2017/051711, filed on Jun. 27, 2017.

(30) Foreign Application Priority Data

Jul. 12, 2016  (FR) ..................... 16 56694

(51) Int. Cl.
*F02K 1/70* (2006.01)
*F02K 1/80* (2006.01)
(Continued)

(52) U.S. Cl.
CPC ............... *F02K 1/70* (2013.01); *B64D 29/06* (2013.01); *F02C 7/25* (2013.01); *F02C 7/28* (2013.01);
(Continued)

(58) Field of Classification Search
CPC ... F02K 1/80; F02K 1/805; F02K 1/70; F02C 7/25; F02C 7/28; B64D 29/06; B64D 29/08; F05D 2240/55; F05D 2240/57
See application file for complete search history.

(56) References Cited

U.S. PATENT DOCUMENTS

| 4,683,717 A * | 8/1987 | Naud ..................... B64D 29/08 60/226.1 |
| 2009/0165463 A1 * | 7/2009 | Vauchel ................. B64D 29/00 60/797 |

(Continued)

FOREIGN PATENT DOCUMENTS

| EP | 0835805 | 4/1998 |
| FR | 2920215 | 2/2009 |

OTHER PUBLICATIONS

International Search Report for international application PCT/FR2017/051711, dated Oct. 30, 2017.

*Primary Examiner* — Andrew H Nguyen
(74) *Attorney, Agent, or Firm* — Burris Law, PLLC

(57) ABSTRACT

The present disclosure relates to a rear assembly of a turbojet engine nacelle that includes a thrust reverser fixed structure having at least one half-cowl mounted on a beam pivotally hinged by at least one hinge, a suspension mast on which the fixed structure is movably mounted, a hatch for access to the hinge of the half-cowl, and a fireproof sealing device which includes a sealing gasket adapted to provide sealing between a median section of the nacelle and the beam area. The sealing gasket includes a tubular gasket type lower portion which extends at least partially over a seal bearing edge of the half-cowl that is adapted to cooperate with a seal bearing wall of the mast and an upper portion including an elastically deformable sealing sheet extending from the seal bearing wall of the mast to the rear face of the hatch for access to the hinge.

8 Claims, 4 Drawing Sheets

(51) Int. Cl.
*B64D 29/06* (2006.01)
*F02C 7/25* (2006.01)
*F02C 7/28* (2006.01)

(52) U.S. Cl.
CPC ............... *F02K 1/80* (2013.01); *F02K 1/805* (2013.01); *F05D 2230/60* (2013.01); *F05D 2240/55* (2013.01)

(56) References Cited

U.S. PATENT DOCUMENTS

| | | | |
|---|---|---|---|
| 2010/0107599 A1* | 5/2010 | Vauchel | B64D 29/08 60/226.2 |
| 2015/0098810 A1* | 4/2015 | Soria | F01D 25/005 415/200 |
| 2015/0175272 A1* | 6/2015 | Brochard | B64D 45/00 244/54 |

* cited by examiner

REAR ASSEMBLY OF A TURBOJET ENGINE NACELLE INCLUDING A FIREPROOF SEALING DEVICE

CROSS-REFERENCE TO RELATED APPLICATIONS

This application is a continuation of International Application No. PCT/FR2017/051711, filed on Jun. 27, 2017, which claims priority to and the benefit of FR 16/56694 filed on Jul. 12, 2016. The disclosures of the above applications are incorporated herein by reference.

FIELD

The present disclosure concerns a rear assembly of a turbojet engine nacelle including a fireproof sealing device.

BACKGROUND

The statements in this section merely provide background information related to the present disclosure and may not constitute prior art.

As is known per se, an aircraft engine, which generally consists of a turbojet engine, is placed inside a nacelle which, amongst other functions:

ensures the aerodynamic fairing of the engine,
allows channeling outside air towards the engine, and
allows connecting the engine to the aircraft.

Indeed, the nacelle presents generally a tubular structure comprising an air inlet upstream of the turbojet engine, a median section intended to surround a fan of the turbojet engine, a downstream section intended to surround the combustion chamber of the turbojet engine and accommodating, where appropriate, thrust reversal means.

Modern nacelles are intended to accommodate a bypass turbojet engine capable of generating via the blades of the rotating fan a hot air flow (also called primary flow) originating from the combustion chamber of the turbojet engine and a cold air flow (secondary flow) which circulates outside the turbojet engine through an annular passage, also called secondary flow path, formed between a fairing of the turbojet engine and an inner wall of the nacelle.

The two air flows are ejected from the turbojet engine by the rear of the nacelle.

The role of a thrust reverser, during the landing of an aircraft, is to improve the braking capacity of the latter by redirecting forward at least part of the air ejected from the turbojet engine. In this phase, the thrust reverser obstructs at least part of the flow path of the cold air and directs this flow to the front of the nacelle, thereby generating a counter-thrust which is added to the braking of the wheels and air brakes of the aircraft.

In general, the structure of a thrust reverser comprises a cowl which is mounted movable in longitudinal translation from front backwards according to a direction substantially parallel to the axis of the nacelle, between a closed position in which the cowl ensures the aerodynamic continuity of the nacelle, and an open position in which the cowl opens a passage in the nacelle.

In the case of a cascade-type thrust reverser, the reorientation of the air flow is performed by cascade vanes, associated to thrust reverser flaps brought to block at least partially the air circulation flow path, the cowl having only a simple slide function aiming at uncovering or covering again these cascade vanes.

In turn, the thrust reverser flaps, also called blocking flaps, are activated and driven by sliding of the movable cowl until obstructing at least partially the flow path downstream of the cascades, so as to optimize the reorientation of the cold air flow.

There are known nacelles called "C-Duct," or "D-Duct," which comprise a structure called thrust reverser fixed structure which is intended to surround a downstream portion of the turbojet engine.

This fixed structure includes two half-cowls which are deployed "in a butterfly fashion" and which are pivotally hinged by hinges, about a longitudinal hinge axis, between a working position in which the half-cowls form a portion of the downstream fairing of the turbojet engine and define the cold air annular flow path with a thrust reverser cowl, and a maintenance position in which the half-cowls are brought away from the turbojet engine.

Each of the two half-cowls is mounted on a longitudinal support half-beam, called 12 O'clock beam, pivotally mounted on the mast, the rotational movement of each half-beam on the mast ensuring pivoting of each half-cowl relative to this mast.

It is known to equip the nacelle with a fireproof sealing device, such as the device described and represented in the document FR-A1-2920215, which includes a lip sealing gasket designed to be interposed between a cowl of a rear section of a nacelle and a turbojet engine.

There is also known a fireproof sealing device described and represented in the document EP-A2-0835805 which describes and represents a labyrinth gasket including a pair of plates formed between the support mast of the nacelle and an outer structure of the nacelle.

It is known to equip the nacelle with a fireproof sealing device which includes a sealing gasket adapted to provide sealing between a median section of the nacelle which surrounds the fan of the turbojet engine and the 12 O'clock beam area.

To this end, each half-cowl includes a partition wall which extends in a plane perpendicular to the hinge axis and which partitions the 12 O'clock beam area.

The partition wall delimits a seal bearing edge which is arranged opposite the mast.

The sealing device generally includes a tubular gasket made of elastomer which is mounted on the seal bearing edge of the partition wall so as to cooperate with the mast.

When the half-cowls occupy their working position, the associated gasket is compressed by an associated seal bearing wall delimited by the mast.

In particular, the tubular gasket has an intermediate segment which extends in a plane perpendicular to the axis of the nacelle, from a lower portion to an upper portion.

According to the prior art, the upper portion of the tubular gasket bears on a lower face of the hatch for access to the hinges of the associated half-cowl, in order to ensure fireproof sealing.

Nonetheless, on a thrust reverser type, the position of the pivot axis of the half-cowl of the thrust reverser relative to the mast may prevent such a configuration.

Indeed, depending on the transverse and vertical position of the pivot axis of the half-cowl, and the offset of this axis relative to the tubular gasket, the tubular gasket may resist the opening and the closure of the half-cowl by being overcompressed against the mast during pivoting of the half-cowl.

SUMMARY

The present disclosure provides a rear assembly of a turbojet engine nacelle, the nacelle having a generally tubular shape which extends along a longitudinal axis, the rear assembly comprising:

a thrust reverser fixed structure which is intended to surround a downstream portion of the turbojet engine, said structure including at least one half-cowl which is mounted on a beam pivotally hinged by at least one hinge, about a longitudinal hinge axis, between a working position in which the half-cowl forms a portion of the downstream fairing of the turbojet engine and defines half of a cold air annular flow path, and a maintenance position in which the half-cowl is brought away from the turbojet engine, the half-cowl including a partition wall which extends in a plane perpendicular to the hinge axis so as to partition a beam area, and which delimits a seal bearing edge;

a suspension mast of the nacelle on which the fixed structure is movably mounted, the mast forming a seal bearing wall which is delimited by a lower face arranged opposite the seal bearing edge of the half-cowl, and an opposite upper face;

a hatch for access to the hinge of the half-cowl, which is delimited by a seal bearing lower face arranged opposite the hinge, and an upper fairing face; and a fireproof sealing device which includes a sealing gasket adapted to provide sealing between a median section of the nacelle which surrounds a fan of the turbojet engine and the beam area, the rear assembly being characterized in that said sealing gasket is made into two portions which comprise:

a tubular gasket type lower portion, which extends at least partially over said seal bearing edge of the half-cowl, and which is adapted to cooperate with the seal bearing wall of the mast; and an upper portion comprising an elastically deformable sealing sheet which extends from the seal bearing wall of the mast, to the lower face of the hatch for access to the hinge.

The assembly according to the present disclosure enables opening and closure of the half-cowl without overcompression of the gasket or collision between the cowl and the mast, in particular thanks to the thinness and the elasticity of the sealing sheet which is designed to collapse during pivoting of the half-cowl.

According to another feature of the present disclosure, the sealing sheet extends from a base connected on the seal bearing wall of the mast, to a free end which is adapted to cooperate with the lower face of the hatch for access to the hinge.

According to this feature, the sheet provides fireproof sealing between the mast and the hatch for access to the hinge.

According to another feature of the present disclosure, the base of the sealing sheet which is connected on the seal bearing wall of the mast forms a spring leaf which enables the sealing sheet to be elastically biased towards the lower face of the hatch.

According to one form, the sealing sheet of the sealing gasket is made of sheet metal.

According to another feature of the present disclosure, the lower portion of the sealing gasket is made of elastomer.

According to another feature of the present disclosure, the sealing device includes a flap seal which extends from an upper end connected on a fairing of the mast, to a free lower end which bears on the hatch for access to the hinge, so that the hatch is interposed between said flap seal and the sealing sheet of the sealing gasket.

The flap seal is designed to limit the entries of air between the mast and the nacelle.

The present disclosure also concerns a method for mounting the rear assembly of a turbojet engine nacelle, the hatch for access to the hinge including an upper fairing and a lower plate which forms the seal bearing lower face of the hatch, and the mounting method including at least:

a first step of setting in position the lower plate of the hatch, which comprises positioning the seal bearing lower face of the lower plate of the hatch bearing on a free end of the sealing sheet; and a second step of fastening the upper fairing on the lower plate of the hatch.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
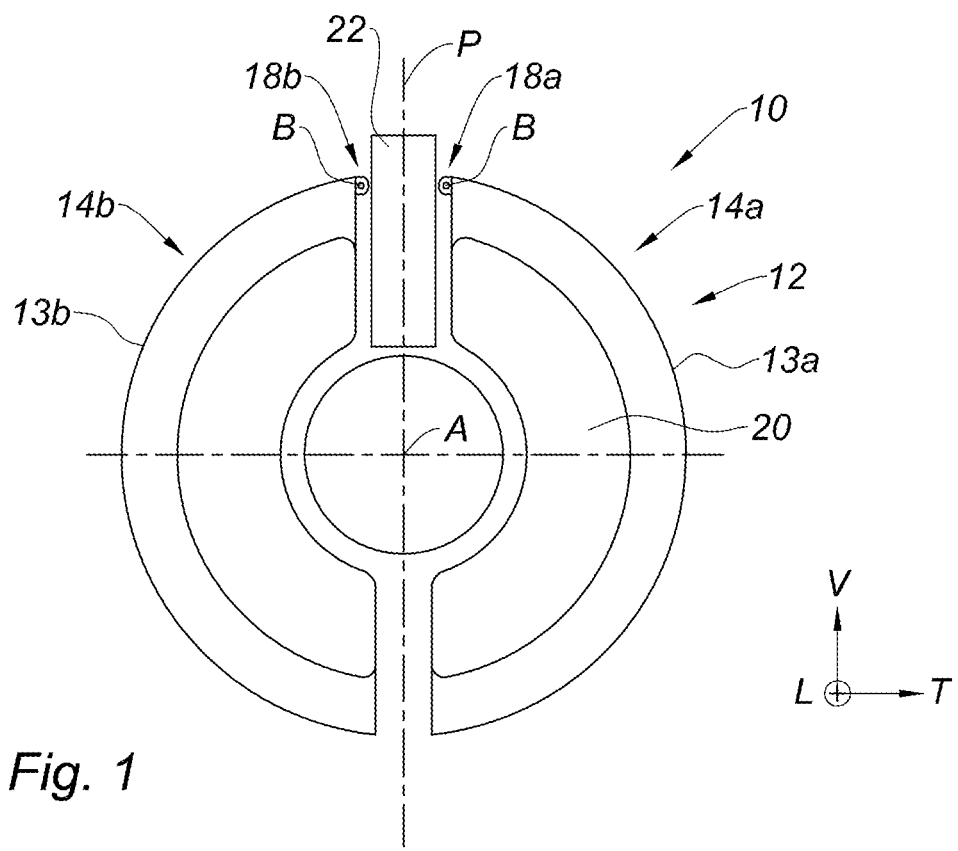
FIG. 1 is a schematic cross-sectional view of a rear assembly of a nacelle according to the present disclosure, including two half-cowls of a fixed structure of the downstream section of a nacelle, in the working position.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

In the description and the claims, the expressions "upper," "lower" and their derivatives will be used without limitation with reference respectively to the upper portion and the lower portion of FIG. 1.

In addition, in order to clarify the description and the claims, the terms longitudinal, vertical and transverse will be adopted without limitation with reference to the trihedron L, V, T indicated in the figures, whose axis L is parallel to the axis A of the nacelle.

In all these figures, identical or similar reference numerals represent identical or similar members or sets of members.

It should be noted that in the present patent application, the terms "upstream" and "downstream" should be understood with regards to the circulation of the air flow inside the propulsion assembly formed by the nacelle and the turbojet engine.

In order to facilitate the understanding of the description, identical elements symmetrical with respect to the plane of symmetry P are indicated by the same reference numerals differentiated by the letter "a" or "b."

In FIG. 1, there is represented a rear assembly 10 of a turbojet engine nacelle, the nacelle (partially represented) have a generally tubular shape which extends along a longitudinal axis A.

The rear assembly 10 comprises a thrust reverser fixed structure 12 which is intended to surround a downstream portion of the turbojet engine.

The structure 12 is said "fixed" in opposition with the thrust reverser cowls 13a, 13b which are slidably mounted.

The fixed structure 12 includes two half-cowls 14a, 14b which have a symmetrical design with respect to the plane of symmetry P represented in FIG. 1.

The two half-cowls 14a, 14b are hingedly mounted each pivoting on a beam 16a, 16b respectively, called "12 O'clock beams," by several hinges 18a, 18b, about a longitudinal hinge axis B.

Figure 2:
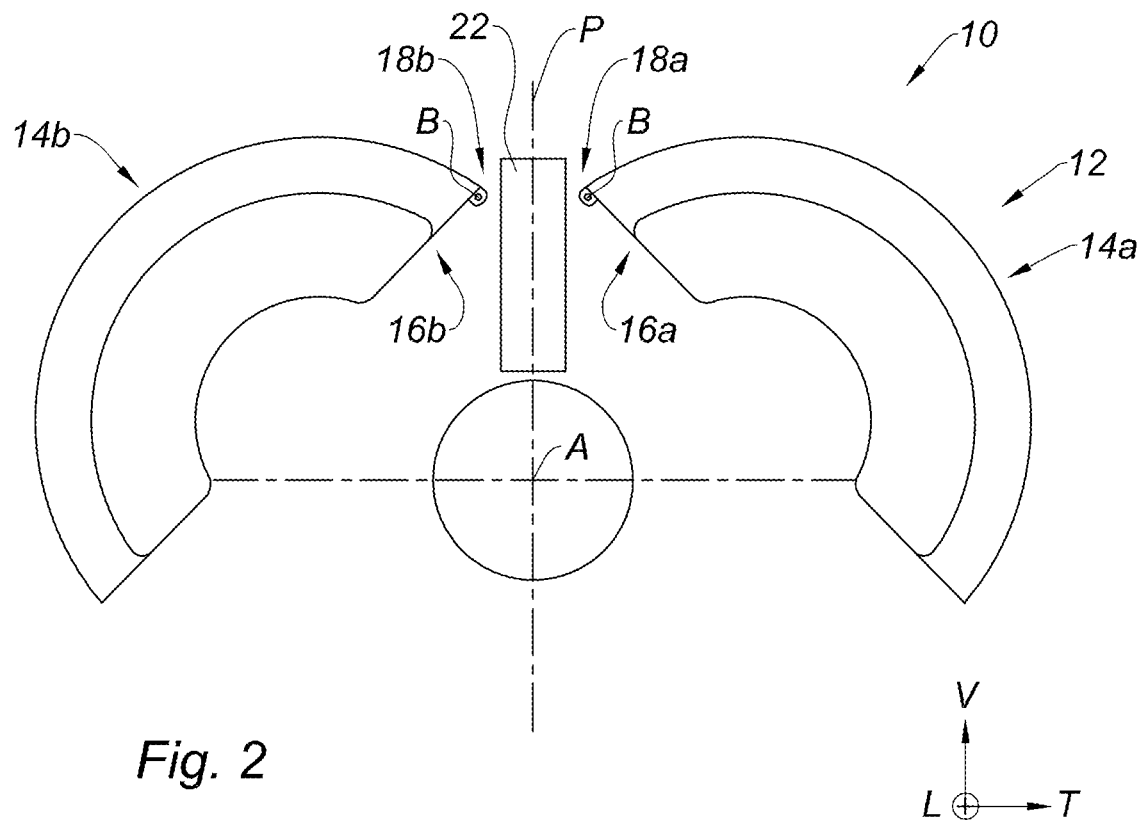
FIG. 2 is a schematic view illustrating the two half-cowls of FIG. 1 in the maintenance position.

The two half-cowls 14a, 14b are pivotally mounted between a working position illustrated in FIG. 1, and a maintenance position illustrated in FIG. 2.

In their working position, the two half-cowls 14a, 14b form the downstream fairing of the turbojet engine and define the cold air annular flow path 20, called secondary flow path, with the thrust reverser cowls 13a, 13b.

In their maintenance position, the two half-cowls 14a, 14b are brought away from the turbojet engine to enable access to the turbojet engine.

As shown in FIG. 1, the rear assembly 10 includes a suspension mast 22 of the nacelle on which the fixed structure 12 is movably mounted via the hinges 18a, 18b.

For clarity, and in order not to burden the description, only the half located to the right of the plane of symmetry P according to FIG. 1 is described in more detail in the following description.

Also, by symmetry with respect to the plane P of FIG. 1, it should be understood that the right and left portions of the rear assembly 10 according to the present disclosure are identical.

Figure 4:
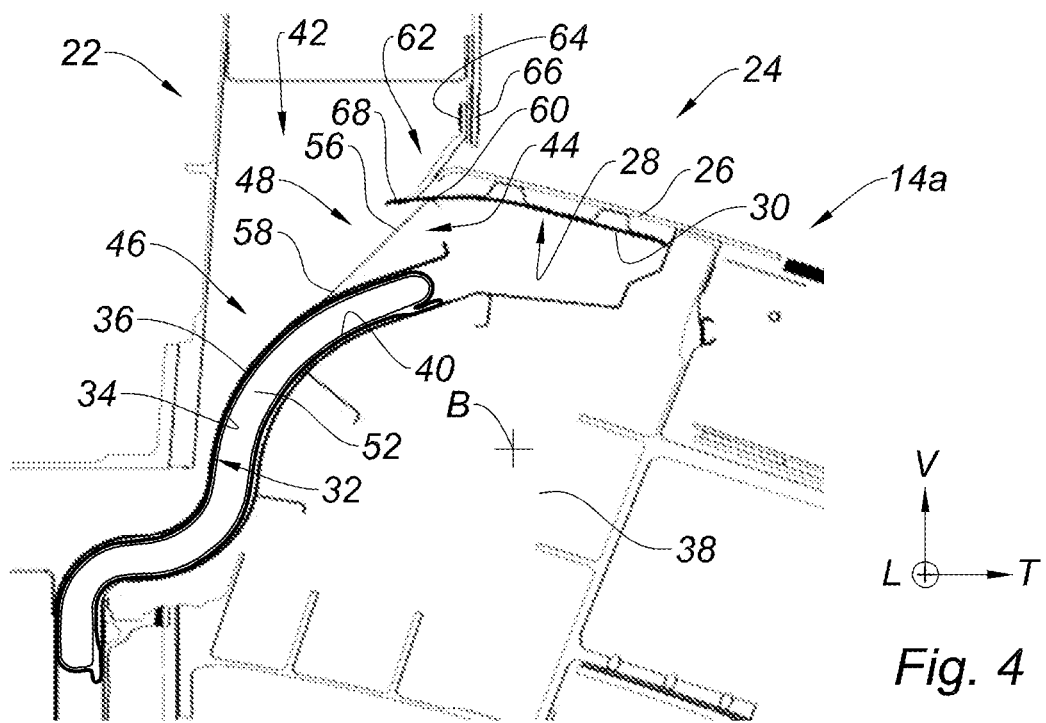
FIG. 4 is a detail cross-sectional view illustrating the fireproof sealing device with the half-cowl in the working position according to the present disclosure.

Referring to FIG. 4, the half-cowl 14a includes a hatch 24 for access to the hinges 18a.

Figure 6:
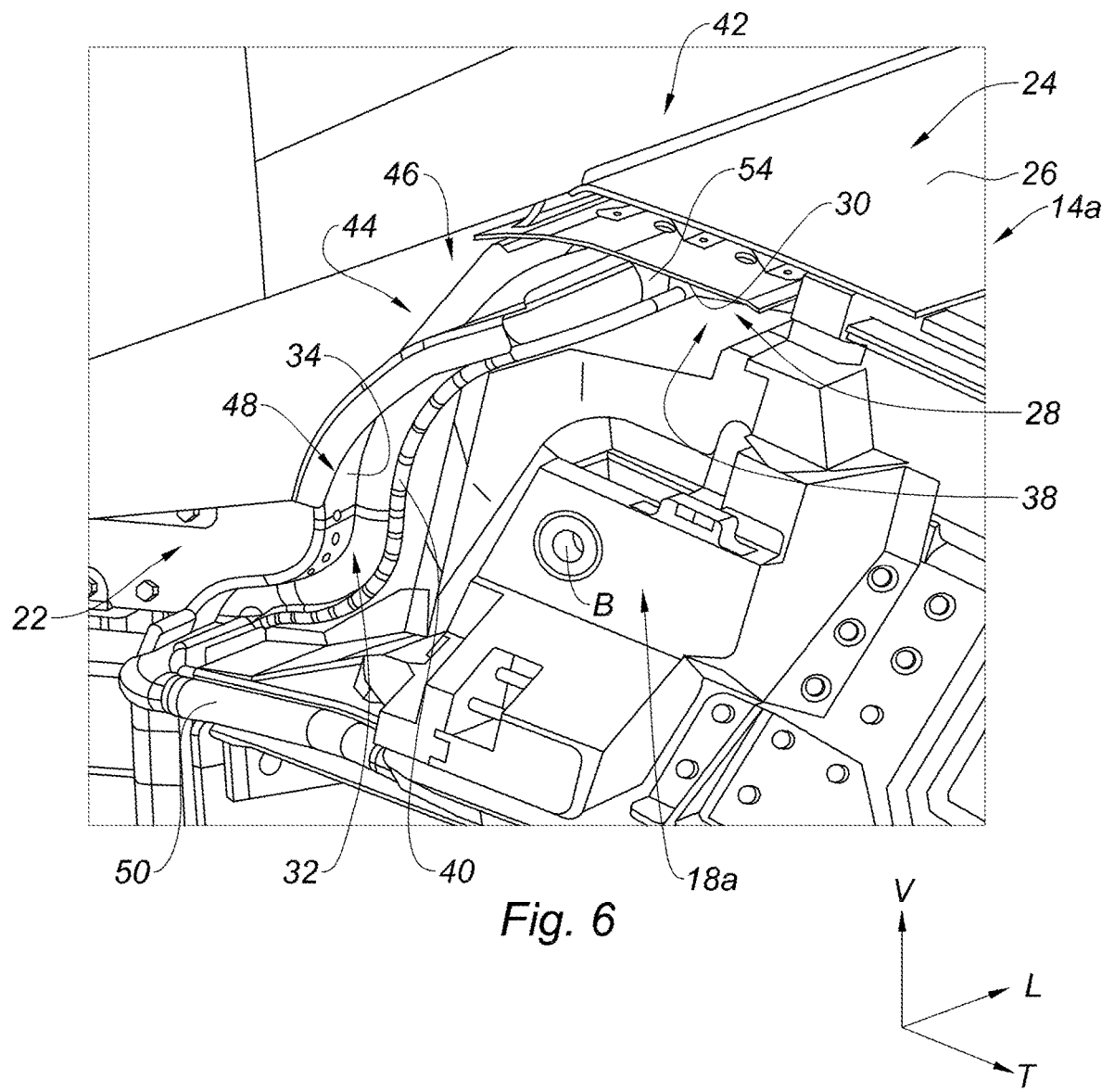
FIG. 6 is a detail perspective view illustrating the fireproof sealing device according to the present disclosure.

The hatch 24, which is also shown in FIG. 6, includes an upper fairing 26 and a lower plate 28 which delimits a seal bearing lower face 30 and which is arranged opposite the associated hinge 18a.

According to FIGS. 4 and 6, the mast 22 forms a seal bearing wall 32 which is delimited by a lower face 34 arranged opposite the half-cowl 14a, and an opposite upper face 36.

In addition, the half-cowl 14a includes a partition wall 38 which extends in a plane perpendicular to the hinge axis B so as to partition an area for access to the beam 16a, this area being called "beam area."

Figure 3:
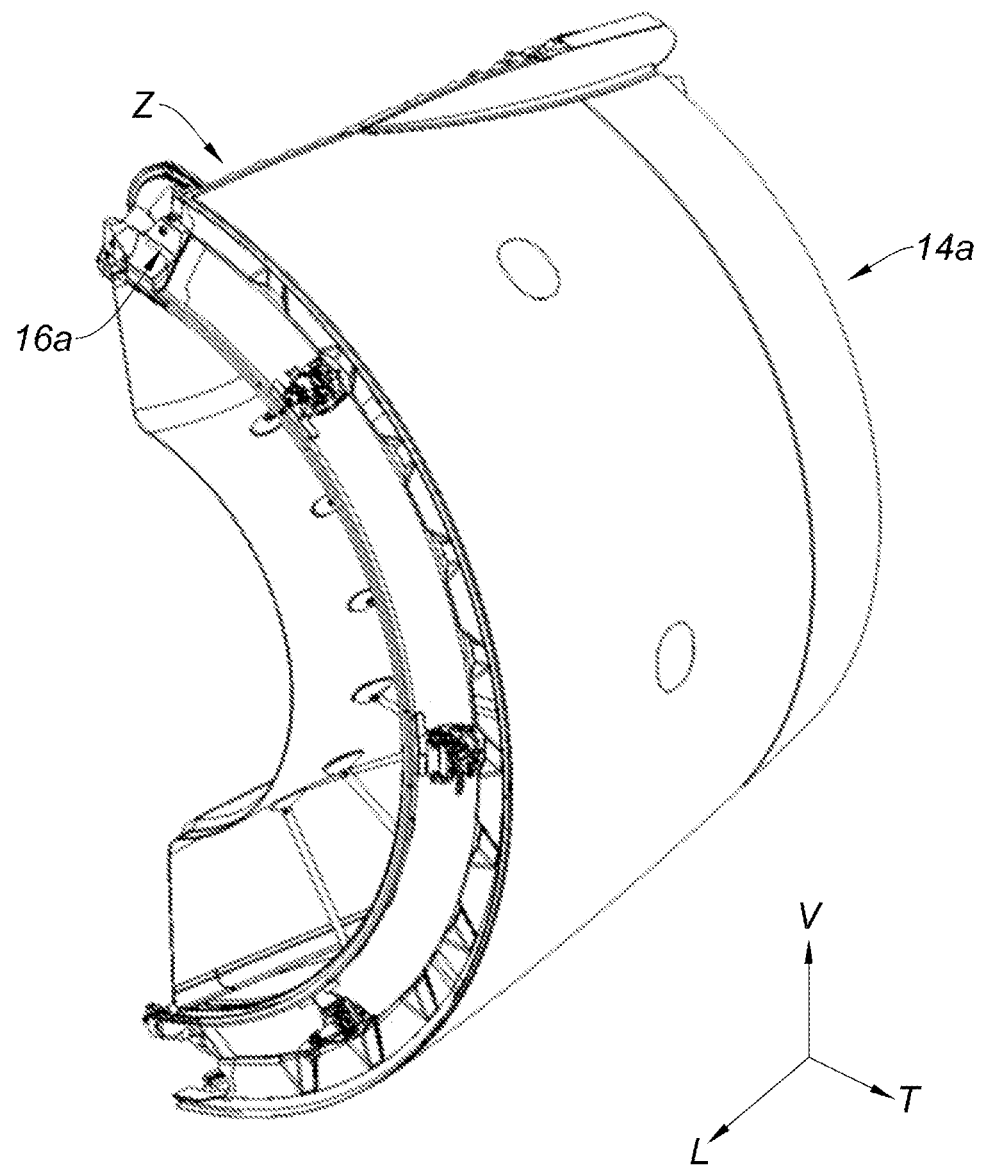
FIG. 3 is a perspective view illustrating a half-cowl of the downstream section of the nacelle of FIG. 1.

This beam area is identified in FIG. 3 by the reference Z.

The partition wall 38 delimits a seal bearing edge 40 which is arranged opposite the seal bearing wall 32 of the mast 22 and which has a curved shape complementary with the shape of the seal bearing wall 32 of the mast 22.

In accordance with the present disclosure, the rear assembly 10 is equipped with a fireproof sealing device 42 which includes a sealing gasket 44 adapted to provide sealing between a median section (not represented) of the nacelle which surrounds a fan of the turbojet engine and the beam area.

The sealing gasket 44 is made into two portions, namely a lower portion 46 and an upper portion 48.

Referring to FIG. 6, the lower portion 46 is formed by a flexible tubular gasket made of elastomer which includes an upstream segment 50 which extends transversely on the upstream end of the fixed structure 12, opposite the median section of the nacelle, and which extends longitudinally against the seal bearing wall 32 of the mast 22.

The upstream segment 50 is connected on an intermediate segment 52 which extends in a plane perpendicular to the hinge axis B over the seal bearing edge 40 of the half-cowl 14a.

The intermediate segment 52 is extended by a downstream segment 54 which extends longitudinally up to the partition wall 38.

Figure 5:
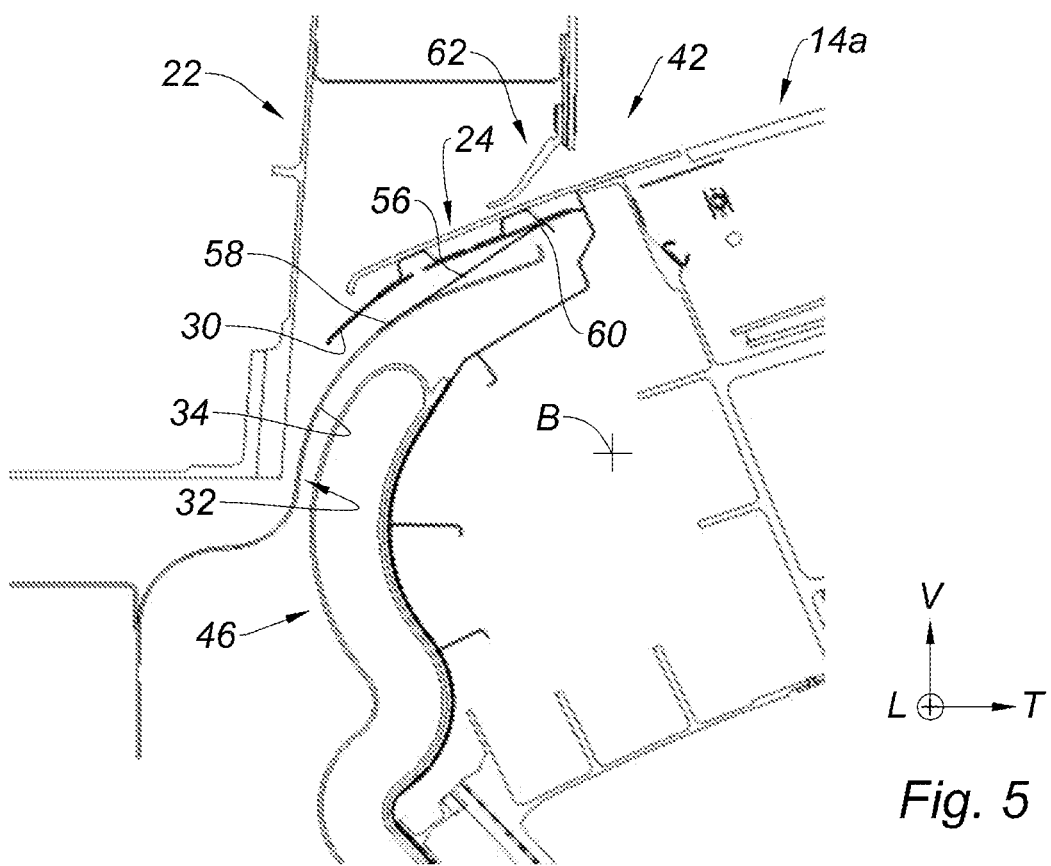
FIG. 5 is a detail cross-sectional view illustrating a fireproof sealing device with the half-cowl in the maintenance position according to the present disclosure.

As shown in FIG. 5, the lower portion 46 of the sealing gasket 44 has a curved shape which is adapted to be compressed by the seal bearing wall 32 of the mast 22 yet without overcompression, to enable the opening and the closure of the half-cowl 14a about the hinge axis B.

The upper portion 48 of the sealing gasket 44 allows continuing sealing achieved by the lower portion 46, up to the hatch 24.

To this end, the upper portion 48 comprises an elastically deformable sealing sheet 56 which extends from the seal bearing wall 32 of the mast 22, to the lower face 30 of the hatch 24 for access to the hinges of the thrust reverser.

The sealing sheet 56 extends from a base 58 which is connected on the upper face 36 of the seal bearing wall 32 of the mast 22, to a free end 60 which is adapted to cooperate with the lower face 30 of the access hatch 24 when the half-cowl 14a occupies its working position.

The free end 60 of the sealing sheet 56 is folded back to enable the free end 60 to slip over the hatch 24 during the opening of the half-cowl 14a, as shown in FIG. 5.

The base 58 of the sealing sheet 56 forms a spring leaf which enables the sealing sheet 56 to be elastically biased towards the lower face of the hatch 24 and which also enables the sealing sheet 56 to collapse under the pressure of the hatch 24 during the opening of the half-cowl 14a, as shown in FIG. 5.

For this purpose, in one form, the sealing sheet 56 is made of sheet metal.

Also, the sealing sheet 56 extends longitudinally to the partition wall 38 to inhibit a possible flame from penetrating into the beam area.

According to another aspect, the sealing device 42 includes a flap seal 62 which extends from an upper end 64 connected on a vertical face of the fairing 66 of the mast 22, to a free lower end 68 which bears on the hatch 24 for access to the hinge, so that the access hatch 24 is interposed between the flap seal 62 and the sealing sheet 56.

In particular, the flap seal 62 allows limiting the entries of air beyond the fairing.

The present disclosure also concerns a method for mounting the rear assembly 10 according to the present disclosure, the method including in particular a first step of setting in position the lower plate 28 of the hatch 24.

The position setting step comprises positioning the seal bearing lower face 30 of the lower plate 28 of the hatch 24 bearing on the free end 60 of the sealing sheet 56.

This position setting step also includes fastening the lower plate 28 of the hatch 24 on the half-cowl 14*a*, and more particularly on the associated beam 16*a*.

The method includes a second step of fastening the upper fairing 26 of the hatch 32 on the previously fastened lower plate 28 of the hatch 32.

This two-step method aims at making reliable the setting in position of the lower plate 28 of the hatch 32 whose end should be interposed between the flap seal 62 and the free end 60 of the sealing sheet 56.

Indeed, the absence of the upper fairing 26 promotes visibility for inserting and positioning the lower plate 28 in its place.

The present description of the present disclosure is given as a non-limiting example.

Unless otherwise expressly indicated herein, all numerical values indicating mechanical/thermal properties, compositional percentages, dimensions and/or tolerances, or other characteristics are to be understood as modified by the word "about" or "approximately" in describing the scope of the present disclosure. This modification is desired for various reasons including industrial practice, manufacturing technology, and testing capability.

As used herein, the phrase at least one of A, B, and C should be construed to mean a logical (A OR B OR C), using a non-exclusive logical OR, and should not be construed to mean "at least one of A, at least one of B, and at least one of C.

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. A rear assembly of a turbojet engine nacelle, the nacelle having a tubular shape which extends along a longitudinal axis, the rear assembly comprising:
    a thrust reverser fixed structure surrounding a downstream portion of a turbojet engine, said thrust reverser fixed structure including at least one half-cowl mounted on a beam pivotally hinged by at least one hinge about a longitudinal hinge axis between a working position in which the at least one half-cowl forms a portion of the downstream portion of the turbojet engine and defines half of a cold air annular flow path, and a maintenance position in which the half-cowl is brought away from the turbojet engine, the at least one half-cowl including a partition wall extending in a plane perpendicular to the longitudinal hinge axis so as to partition a beam area and delimit a seal bearing edge;
    a suspension mast on which the thrust reverser fixed structure is movably mounted, the suspension mast forming a seal bearing wall delimited by a lower face arranged opposite the seal bearing edge of the at least one half-cowl and an opposite upper face;
    a hatch delimited by a seal bearing lower face arranged opposite the at least one hinge and an upper fairing face; and
    a fireproof sealing device including a sealing gasket adapted to provide sealing between a median section of the nacelle surrounding a fan of the turbojet engine and the beam area, the sealing gasket comprising:
        a lower portion extending at least partially over said seal bearing edge of the at least one half-cowl and adapted to cooperate with the seal bearing wall of the suspension mast; and
        an upper portion comprising an elastically deformable sealing sheet extending from the seal bearing wall of the suspension mast to the lower face of the hatch.

2. The rear assembly according to claim 1, wherein the sealing sheet extends from a base connected on the seal bearing wall of the suspension mast to a free end which is adapted to cooperate with the lower face of the hatch.

3. The rear assembly according to claim 2, wherein the base of the sealing sheet forms a spring leaf such that the sealing sheet is elastically biased towards the lower face of the hatch.

4. The rear assembly according to claim 1, wherein the sealing sheet of the sealing gasket is made of sheet metal.

5. The rear assembly according to claim 1, wherein the lower portion of the sealing gasket is made of elastomer.

6. The rear assembly according to claim 1, wherein the fireproof sealing device includes a flap seal which extends from an upper end connected on a fairing of the suspension mast to a free lower end which bears on the hatch such that the hatch is interposed between said flap seal and the sealing sheet of the sealing gasket.

7. The rear assembly according to claim 1, wherein the lower portion of the sealing gasket of the fireproof sealing device is a tubular gasket.

8. A method for mounting the rear assembly according to claim 1, the hatch including an upper fairing and a lower plate which forms the seal bearing lower face of the hatch, the method comprising:
    setting the lower plate of the hatch in position by positioning the seal bearing lower face of the lower plate of the hatch bearing on a free end of the sealing sheet; and
    fastening the upper fairing of the hatch on the lower plate of the hatch.

* * * * *